United States Patent
Pagano

[15] 3,694,447
[45] Sept. 26, 1972

[54] COMPLEXES OF PHOSPHANILIC ACID AND 9-AMINO-3-NITROACRIDINE

[72] Inventor: Joseph F. Pagano, Paoli, Pa.

[73] Assignee: Smith Kline & French Laboratories, Philadelphia, Pa.

[22] Filed: March 10, 1970

[21] Appl. No.: 18,312

[52] U.S. Cl............260/279 R, 260/502.5, 424/267
[51] Int. Cl. .............................................C07d 37/24
[58] Field of Search.................260/279, 502.5, 502.1

[56] References Cited

UNITED STATES PATENTS

| | | |
|---|---|---|
| 2,092,131 | 7/1937 | Mietzsch ....................260/279 |
| 2,605,280 | 7/1952 | Klotz ........................260/502.5 |
| 3,346,579 | 10/1967 | Sheehan .....................260/279 |
| 3,442,938 | 5/1969 | Christensen et al. ....260/502.5 |
| 3,122,553 | 2/1964 | Seneca ......................260/279 |
| 2,245,539 | 6/1941 | Warnat......................260/279 |

Primary Examiner—Donald G. Daus
Attorney—William H. Edgerton, Richard D. Foggio, Joan S. Keps, Alan D. Lourie and Joseph A. Marlino

[57] ABSTRACT

Complexes of phosphanilic acid and an aminoacridine possess broad-spectrum antibacterial and antifungal activity when used topically. The preferred complex is a 1:1 complex of phosphanilic acid and 9-amino-3-nitroacridine.

3 Claims, No Drawings

COMPLEXES OF PHOSPHANILIC ACID AND 9-AMINO-3-NITROACRIDINE

This invention relates to compositions having antibacterial activity. In particular, the invention relates to complexes of phosphanilic acid and an acridine compound.

This invention, in its broadest aspect, comprises complexes of phosphanilic acid and an antibacterial acridine.

The invention, in a more limited aspect, comprises complexes of phosphanilic acid and an aminoacridine, preferably a 9-amino, 3-amino, or 6-aminoacridine, said acridine having antibacterial activity.

The invention, in a still more limited aspect, comprises 1:1 and 2:1 complexes of phosphanilic acid (I) and a 9-amino, 3-amino, or 6-aminoacridine (II), said acridine being additionally substituted with one or more amino, methyl, ethyl, chloro, bromo, nitro, methoxy, ethoxy, cyano, phenyl, or related groups and also having antibacterial activity. In formula II, each R is $NH_2$ or H, at least one of such groups

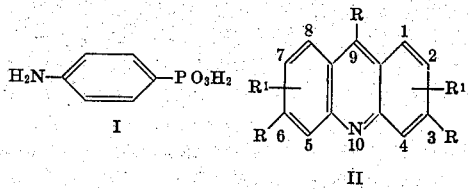

being $NH_2$, and each $R^1$ is hydrogen, amino, methyl, ethyl, methoxy, ethoxy, chloro, bromo, nitro, cyano, or phenyl.

The invention, in its preferred aspect, comprises the 1:1 and 2:1 complexes of phosphanilic acid and 9-amino-3-nitroacridine (III).

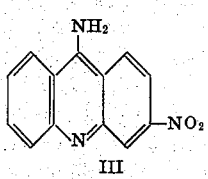

The complexes of the present invention possess the advantages of having broad spectrum activity at low concentrations, being substantive, being bactericidal in action, and being resistant to inactivation by substances such as soap, serum, or lipids. They are also heat stable, stable in formulation, and odor-free. An additional advantage is obtained in the case of complexes having a color which renders them undesirable for topical use, since formation of the complex results in loss of the objectionable color without loss of antibacterial properties.

The complexes of this invention are prepared by mixing together pure samples of phosphanilic acid and the desired acridine. Complex formation is most conveniently achieved by adding a hot solution of the phosphanilic acid to a warmed solution of the acridine. Hot water is then added with stirring, the mixture is cooled, and the product filtered off, washed, and dried. Warm or hot dimethyl sulfoxide is the preferred solvent, although other appropriate solvents, possibly including dimethylformamide, tetramethylene sulfone, or hexamethyl phosphoramide, may be used. Choice of appropriate solvents is well within the skill of the art.

Generally, use of slightly more than two equivalents of phosphanilic acid in reaction with an aminoacridine will result in a 2:1 complex containing two equivalents of phosphanilic acid per equivalent of aminoacridine. Use of one equivalent will yield a 1:1 complex.

The complexes of the invention are active against a wide variety of microorganisms, including Gram-positive bacteria, Gram-negative bacteria, and fungi. This activity is demonstrated for the preferred complexes of the invention, the 1:1 complex of phosphanilic acid and 9-amino-3-nitroacridine (SK&F–36387–2:1) complex of phosphanilic acid and 9-amino-3-nitroacridine (SK&F–36387–J$_2$) in a number of test systems including the agar-inclusion method.

In this system, the test compound is incorporated in agar at two-fold levels from 200 μg/ml downward, and the test organisms inoculated onto the hardened agar surface. Activity is measured as the lowest concentration which prevents growth of the test organism. Results are shown in Table 1.

TABLE 1

IN VITRO ACTIVITY OF SK&F 36387-J AND SK&F 36387-J$_2$

| Organism | Average MIC - μg/nl (Range) SK&F 36387-J (1:1) | SK&F 36387-J$_2$ (2:1) |
|---|---|---|
| Staphylococcus aureus (6 strains) | 15.6 (6.3 – 25) | 26.1 (12.5 – 50) |
| Staphylococcus albus (4 strains) | 8.2 (4.7 – 12.5) | 8.6 (6.3 – 12.5) |
| Streptococcus faecalis (1 strain) | 6.3 | 12.5 |
| Streptococcus pyogenes (4 strains) | 7.6 (0.8 – 12.5) | 15.3 (1.6 – 25) |
| Klebsiella pneumoniae (3 strains) | 9.4 (3.1 – 12.5) | 22.9 (6.3 – 37.5) |
| Escherichia coli (5 strains) | 6.3 (6.3) | 7.5 (6.3 – 9.4) |
| Salmonella sp. (3 strains) | 14.6 (12.5 – 18.8) | 25 (25) |
| Shigella sp. (1 strain) | 3.1 | 3.1 |
| Candida albicans (5 strains) | 15.0 (12.5 – 25) | 25.0 (25) |
| Pseudomonas sp. (21 strains) | 5.1 (1.6 – 12.5) | 7.1 (0.8 – 25) |
| Fungi: | | |
| Fusarium oxysporum Penicillium citrinum | 6.8 (3.1 – 12.5) | 11.0 (3.1 – 25) |
| Aspergillus niger Cryptococcus neoformans Blastomyces dermatitidis Trichophyton mentagrophytes | | |

The 1:1 complex was further tested for activity against a total of 77 strains of Gram-positive and negative bacteria, including 40 strains of Pseudomonas, an organism found difficult to cope with clinically, plus 8 strains of yeast and fungi. Of this spectrum, almost all were recent clinical isolates.

Tested simultaneously with SK&F 36387–J were two highly regarded commercial topical agents, hexachlorophene and nitrofurazone.

In addition to the above, a tube-dilution test was carried out against 6 strains of Proteus sp., a Gram-negative organism which frequently appears in burn cases and in 'mixed' infections.

Results of these experiments are detailed in Tables 2, 3, 4, 5, and 6.

TABLE 2

IN VITRO ACTIVITY AGAINST GRAM POSITIVE BACTERIA (AGAR - INCLUSION METHOD)

| Organism | Minimum Inhibitory Conc. µg/ml | | |
|---|---|---|---|
| | SK&F 36387-J | Hexa-chlorophene | Nitrofurazine |
| *Staphylococcus sp.* | | | |
| H.H. 06992 | 25 | 50 | 25 |
| H.H. 06976 | 12.5 | 12.5 | 25 |
| H.H. 06914 | 12.5 | 12.5 | 25 |
| H.H 06864 | 12.5 | 12.5 | 25 |
| H.H. 07805 | 6.25 | 12.5 | 25 |
| H.H. 06530 | 6.25 | 12.5 | 25 |
| H.H. 49u | 6.25 | 12.5 | 12.5 |
| H.H. 07091 | 6.25 | 12.5 | 12.5 |
| H.H. 30080 | 12.5 | 12.5 | 25 |
| H.H. 30007 | 12.5 | 12.5 | 25 |
| H.H. 30032 | 12.5 | 12.5 | 25 |
| H.H. 29916 | 12.5 | 12.5 | 25 |
| H.H. 29738 | 12.5 | 12.5 | 25 |
| H.H. 29670 | 12.5 | 12.5 | 25 |
| H.H. 30197 | 9.38 | 12.5 | 25 |
| H.H. 30269 | 9.38 | 12.5 | 25 |
| Average *Staphylococcus* sp. MIC (16 strains) | 11.3 | 14.8 | 23.4 |
| *Streptococcus pyogenes* | | | |
| H.H. 514 | 12.5 | 25 | 100 |
| H.H. 238 | 3.12 | 12.5 | 25 |
| H.H. 151 | 0.78 | 12.5 | 4.7 |
| H.H. 07208 | 0.4 | 12.5 | 25 |
| H.H. 07477 | 0.4 | 12.5 | 3.12 |
| Average *Streptococcus pyogenes* MIC (5 strains) | 3.4 | 15.0 | 31.6 |
| Average gram-positive MIC | 9.4 | 14.8 | 25.4 |

TABLE 3

IN VITRO ACTIVITY AGAINST GRAM-NEGATIVE BACTERIA (AGAR - INCLUSION METHOD)

| Organism | Minimum Inhibitory Conc. µg/ml | | |
|---|---|---|---|
| | SK&F 36387-J | Hexa-chlorophene | Nitrofurazine |
| *Escherichia coli* | | | |
| H.H. 01428 | 6.25 | 100 | 9.4 |
| H.H. 01629 | 6.25 | 100 | 6.25 |
| H.H. 01668 | 6.25 | 100 | 4.7 |
| H.H. 01694 | 6.25 | 100 | 6.25 |
| H.H. 20206 | 6.25 | 100 | 12.5 |
| H.H. 20203 | 3.12 | 100 | 6.25 |
| H.H. 20201 | 6.25 | 100 | 25 |
| H.H. 20187 | 6.25 | 100 | 25 |
| H.H. 20170 | 6.25 | 100 | 12.5 |
| Average E. coli MIC (9 strains) | 5.9 | 100 | 11.9 |
| *Klebsiella pneumoniae* | | | |
| H.H. 01482 | 18.8 | 100 | 2.5 |
| H.H. 01607 | 12.5 | 200 | 25 |
| H.H. 19938 | 18.8 | 100 | 25 |
| H.H. 19895 | 18.8 | 100 | 25 |
| Average K. pneumoniae MIC (4 strains) | 17.2 | 125 | 25 |
| *Salmonella sp.* | | | |
| H.H. 94 | 25 | 100 | 12.5 |
| H.H. 96 | 12.5 | 200 | 6.25 |
| *Shigella sp.* | | | |
| H.H. 109 | 3.12 | 50 | 4.7 |
| Average Salmonella/Shigella MIC (3 strains) | 13.5 | 116.6 | 7.8 |
| Average gram-negative MIC | 10.2 | 109.4 | 14.5 |

TABLE 4

IN VITRO ACTIVITY AGAINST PSEUDOMONAS SP. (AGAR - INCLUSION METHOD)

| Organism | Minimum Inhibitory Conc. µ/ml | | |
|---|---|---|---|
| | SK&F 36387-J | Hexa-chlorophene | Nitrofurazone |
| *Pseudomonas sp.* | | | |
| H.H. 12 | 6.3 | 150 | >200 |
| H.H. 38 | 12.5 | >200 | >200 |
| H.H. 56 | 18.8 | 100 | >200 |
| H.H. 63 | 6.3 | 100 | >200 |
| H.H. 1879 | 6.3 | 100 | >200 |
| H.H. 6835 | 12.5 | 100 | >200 |
| H.H. 06910 | 25 | 150 | >200 |
| H.H. 6962 | 3.1 | 100 | >200 |
| H.H. 7180 | 12.5 | 100 | >200 |
| H.H. 07070 | 6.3 | 100 | >200 |
| H.H. 07167 | 18.8 | 150 | >200 |
| ATCC 19660 | 3.1 | 75 | >200 |
| H.H. 22074 | 25 | 75 | >200 |
| H.H. 22106 | 6.3 | 75 | >200 |
| H.H. 22167 | 9.4 | 100 | >200 |
| H.H. 22179 | 18.8 | 100 | >200 |
| H.H. 22863 | 2.3 | 100 | >200 |
| H.H. 22869 | 12.5 | 75 | >200 |
| H.H. 29628 | 3.1 | 100 | >200 |
| H.H. 29621 | 3.1 | 100 | >200 |
| H.H. 29334 | 1.6 | 100 | >200 |
| H.H. 29322 | 3.1 | 100 | >200 |
| H.H. 29310 | 6.3 | 100 | >200 |
| H.H. 29260 | 6.3 | 100 | >200 |
| H.H. 29156 | 6.3 | 100 | >200 |
| H.H. 29674 | 6.3 | 100 | >200 |
| H.H. 29107 | 6.3 | 100 | >200 |
| H.H. 29080 | 9.4 | 100 | >200 |
| H.H. 29063 | 9.4 | 100 | >200 |
| H.H. 28858A | 9.4 | 100 | >200 |
| H.H. 28858B | 6.3 | 100 | >200 |
| H.H. 28858C | 6.3 | 150 | >200 |
| H.H. 29714 | 3.1 | 200 | >200 |
| H.H. 29704 | 3.1 | 100 | >200 |
| H.H. 29689 | 3.1 | 100 | >200 |
| H.H. 29913 | 3.1 | 150 | >200 |
| H.H. 29163B | 1.6 | 150 | >200 |
| H.H. 29830 | 2.3 | 200 | >200 |
| H.H. 28592 | 3.1 | 150 | >200 |
| H.H. 29790 | 2.3 | 150 | >200 |
| Average *Pseudomonas* sp. MIC (40 strains) | 7.8 | 115 | >200 |

TABLE 5

IN VITRO ACTIVITY AGAINST FUNGI (AGAR - INCLUSION METHOD)

| Organism | Minimum Inhibitory Conc. µg/ml | | |
|---|---|---|---|
| | SK&F 36387-J | Hexa-chlorophene | Nitrofurazone |
| *Candida albicans* | | | |
| H.H. 06381 | 12.5 | 50 | >200 |
| H.H. 06324 | 12.5 | 50 | >200 |
| H.H. 06303 | 12.5 | 75 | >200 |
| H.H. 05974 | 12.5 | 75 | >200 |
| H.H. 95222 | 6.25 | 50 | >200 |
| *Trichophyton mentagrophytes* | | | |
| SK&F 17410 | 1.17 | 12.5 | 100 |
| *Penicillum citrinum* | | | |
| ATCC 16040 | 6.25 | 25 | >200 |
| *Aspergillus niger* | | | |
| SK&F 330 | 9.38 | 25 | >200 |
| Average Fungus MIC (8 strains) | 9.10 | 45.3 | >187.5 |

TABLE 6

ACTIVITY OF SK&F 36387-J, HEXACHLOROPHENE AND NITROFURAZONE AGAINST CLINICAL PROTEUS SPECIES

| Proteus sp. | Minimum Inhibitory Conc. μg/ml | | |
|---|---|---|---|
| | SK&F 36387-J | Hexa-chlorophene | Nitrofurazone |
| H.H. 57 | 6.3 | 25 | 50 |
| H.H. 15066 | 12.5 | 25 | 50 |
| H.H. 19962 | 12.5 | 25 | 50 |
| H.H. 01824 | 12.5 | 25 | 50 |
| H.H. 20143 | 3.1 | 25 | 50 |
| H.H. 19942 | 25 | 100 | 100 |
| Average Proteus sp. MIC | 11.9 | 37.5 | 58.3 |

The results show that both complexes possess broad spectrum activity against all strains tested and, in particular, the 1:1 complex (SK&F-36387-J) was effective against 40 hospital strains of Pseudomonas sp. and various clinical strains of Proteus sp. In contrast, hexachlorophene showed poor activity against Gram-negative organisms and nitrofurazone was ineffective against all strains of Pseudomonas and fungi tested.

An antimicrobial agent, to be effective in vivo, must be capable of retaining its activity in the presence of a variety of substances, including whole blood, serum, sebum, pus, and other body fluids. In addition, a topical antimicrobial intended for human use must also remain effective when applied to skin which retains traces of soap.

In vitro experiments were carried out to evaluate the effectiveness of SK&F 36387-J, hexachlorophene, and nitrofurazone against Staphylococcus aureus and Pseudomonas sp. in the presence of serum, soap, and milk. Minimum inhibitory concentrations (MIC) for each condition were established and compared to the MIC in normal medium without neutralizer. The figures presented in Table 7 are expressions of the ratio of MIC in neutralizer broth to MIC in normal broth.

TABLE 7

EFFECT OF NEUTRALIZING SUBSTANCES ON ANTIBACTERIAL ACTIVITY

| Compound | Test Organism | Effect of Neutralizer on MIC* | | |
|---|---|---|---|---|
| | | Soap | Milk | Serum |
| SK&F 38387-J | Staph. aureus FDA 209 | 1.4× | 1.5× | 2× |
| | Pseudomonas sp. HH 1879 | 11× | 2× | 2× |
| Hexachlorophene | Staph. aureus FDA 209 | 1× | >4.5× | >250× |
| | Pseudomonas sp. HH 1879 | 4× | 64× | 128× |
| Nitrofurazone | Staph. aureus FDA 209 | 0.5× | 1× | 2× |
| | Pseudomonas sp. HH 1879 | Not Active at 1000 μg/ml. | Not Active at 1000 μg/ml. | Not Active at 1000 μg/ml. |

*Expressed in multiples of MIC in normal broth (no neutralizer added).

The results show that SK&F 36387-J is able to retain antimicrobial activity in the presence of neutralizing substances. In media containing 20 percent serum and 5 percent milk (representative of organic and lipid materials), loss of activity was very slight. In the presence of soap, the anti-Pseudomonas activity of SK&F 36387-J was reduced moderately, but its anti-Staphylococcus activity suffered little. Hexachlorophene's activity in the presence of soap diminished slightly. In the presence of milk, loss of antibacterial activity became greater, and in the presence of 20 percent serum, activity loss was very severe, with MIC's ranging from 128× to greater than 250× the drug level found effective in normal medium. Nitrofurazone lost little of its activity against Staphylococcus in the presence of serum, milk, or soap. Against Pseudomonas, however, nitrofurazone displayed no activity at 1,000 μg/ml under any in vitro test conditions, including medium containing no neutralizing substances.

The substantivity of a compound, or its ability to be retained by the cells of the skin, is a valuable characteristic for topical agents. Hexachlorophene's ability to do so is well known and serves as one of its major attractions, offsetting its limited spectrum of activity. Experiments were carried out to assess the in vitro substantivity of SK&F 36387-J, hexachlorophene and nitrofurazone using an in vitro method utilizing skin discs. In this system, standardized calf skin discs are immersed in solutions of drug for 30 minutes, then vigorously washed in running water for extended period of time. Washed discs are then placed on agar surfaces inoculated with Staphylococcus aureus and Pseudomonas sp. for 30 minutes, after which the discs are removed and the plates incubated. A substantive compound is defined as one which is sufficiently retained by the calf skin discs to produce zones of inhibition, despite the vigorous washing. The results of these in vitro experiments are shown in Table 8. Data are expressed as the diameter of the zones of inhibition produced by washed calf skin discs after exposure to solutions of the test compounds.

TABLE 8

SUBSTANTIVITY TEST - ZONES OF INHIBITION (mm.) PRODUCED BY WASHED CALF SKIN DISCS*

| Compound | Test Level | Staph. aureus var Smith Wash time | | | Pseudomonas sp. HH 1879 Wash time | | |
|---|---|---|---|---|---|---|---|
| | | 0 | 1 hr. | 2½hr. | 0 | 1 hr. | 2½hr. |
| SK&F 36387-J | 0.05% | 14.5 | 13 | 11 | 25 | 23 | 16.5 |
| | 0.2% | 20 | 16 | 14 | 40 | 27.5 | 24.5 |
| Nitrofurazone | 0.05% | 18.5 | 4 | 0 | 0 | 0 | 0 |
| | 0.2% | 27 | 11.5 | 9 | 0 | 0 | 0 |
| Hexachlorophene | 0.05% | 21.5 | 13.5 | 13.5 | 0 | 0 | 0 |
| | 0.2% | 22.5 | 20 | 17 | 11 | Very Slight | Very Slight |

* Average of two tests

SK&F 36387-J was found to be substantive at both 0.05 and 0.2 percent. Activity of the compound against Staphylococcus aureus and Pseudomonas sp. was still evident after wash cycles of up to 2½ hours. Hexachlorophene also displayed substantivity at both high and low test levels after prolonged washing. Nitrofurazone remained substantive after maximum wash time only at its higher test level; substantivity at the lower test level was no longer evident when disc wash time was extended to 2½ hours.

Antimicrobial agents can be shown to exert either of two types of effects on bacterial cells: a truly lethal, irreversible, action termed "bactericidal", or a reversible action in which the organism, rendered free of the agent, can again multiply, in which case it is termed "bacteriostatic". To determine whether the activity of SK&F 36387-J is bactericidal or bacteriostatic, the following experiment was carried out. Two-fold dilutions of SK&F 36387-J in broth were inoculated with three strains of Gram-negative bacteria (Proteus) and two strains of Gram-positive bacteria (Staphylococcus). After 24 hours incubation the minimum inhibitory concentration (MIC) of SK&F 36387-J was observed. Incubation was continued for an additional 48 hours (total 72 hours) and the end points again observed. To determine if viable bacteria remained in tubes beyond the 72 hour end points, despite the absence of any such evidence, aliquots of each were transferred to complex-free medium. After incubation, tubes were examined for evidence of bacterial growth; if present, the action of SK&F 36387-J would then be known to be bacteriostatic; if absent, the drug action would be bactericidal. Results are shown in Table 9.

TABLE 9

EFFECTS OF PROLONGED INCUBATION ON SK&F 36387-J END POINTS

Minimum Inhibitory Conc. (MIC) SK&F 36387-J ($\mu$g/ml.)

| Condition | Proteus sp. HH 15066 | Proteus Morgani HH 55 | Proteus Morgani HH 57 | Staph. aureus HH 205 | Staph. albus HH 7905 |
|---|---|---|---|---|---|
| 24 hr. MIC | 5.1 | 5.1 | 5.1 | 2.6 | 1.3 |
| 72 hr. MIC | 10.3 | 10.3 | 5.1 | 5.1 | 5.1 |
| Type of inhibition | Cidal | Cidal | Cidal | Cidal | Cidal |

The results show that the MIC's changed only slightly with prolonged incubation. Sub-culturing of aliquots from tubes beyond the 72 hours MIC produced no sign of viable organisms; the action of SK&F 36387-J against both Gram-positive and Gram-negative bacteria is seen to be bactericidal.

Data in Table 4 indicate the anti-Pseudomonas activity of SK&F 36387-J, compared with that of hexachlorophene and nitrofurazone. In further experiments, SK&F 36387-J was compared with compounds well-known for their anti-Pseudomonas properties and therefore used for treatment of burns. These compounds were gentamicin sulfate, mafenide hydrochloride, and silver sulfadiazine. These compounds are all reputed to be highly effective. Compounds were evaluated in an in vitro, agar-inclusion system for activity against 40 hospital strains of Pseudomonas sp. of these experiments are presented in Table 10.

TABLE 10

IN VITRO ACTIVITY AGAINST PSEUDOMONAS SP. (AGAR-INCLUSION METHOD)

| Pseudomonas sp. Strain | Minimum Inhibitory Conc. ($\mu$g/ml)* | | | |
|---|---|---|---|---|
| | SK&F 36387-J | Gentamicin (Base) | Silver sulfadiazine | Mafenide (hcl) |
| HH 29913 | 5.5 | 6.9 | 25 | 400 |
| HH 29980 | 3.1 | 6.9 | 25 | 400 |
| HH 29998 | 1.6 | 6.9 | 25 | 400 |
| HH 28592 | 1.0 | 13.7 | 25 | 400 |
| HH 29308 | 6.0 | 6.9 | 25 | 400 |
| HH 28858-A | 25 | 6.9 | 25 | 400 |
| HH 28858-B | 25 | 3.5 | 25 | 400 |
| HH 28858-C | 18.7 | 6.9 | 25 | 400 |
| HH 29063 | 18.7 | 6.9 | 25 | 400 |
| HH 29080 | 4.7 | 6.9 | 25 | 400 |
| HH 29107 | 15.6 | 6.9 | 25 | 400 |
| HH 22858 | 25 | 6.9 | 25 | 400 |
| HH 29156 | 7.8 | 6.9 | 25 | 400 |
| HH 29260 | 18.7 | 6.9 | 25 | 400 |
| HH 29310 | 12.5 | 6.9 | 25 | 400 |
| HH 29322 | 2.7 | 6.9 | 25 | 400 |
| HH 29323 | 25 | 6.9 | 25 | 400 |
| HH 29334 | 2.3 | 13.7 | 25 | 400 |
| HH 29621 | 9.4 | 3.5 | 12.5 | 400 |
| HH 29674 | 10.9 | 13.7 | 25 | 400 |
| HH 29628 | 6.3 | 3.5 | 25 | 400 |
| HH 29689 | 4.7 | 6.9 | 25 | 400 |
| HH 29704 | 3.1 | 6.9 | 25 | 400 |
| HH 29714 | 4.7 | 6.9 | 25 | 400 |
| HH 22869 | 4.7 | 10.3 | 18.7 | 400 |
| HH 29163-A | 12.5 | 3.5 | 25 | 400 |
| HH 29260 | 9.4 | 6.9 | 12.5 | 400 |
| HH 29270 | 6.3 | 10.3 | 12.5 | 400 |
| HH 29790 | 2.3 | 6.9 | 12.5 | 400 |
| HH 29830 | 4.7 | 3.5 | 12..5 | 400 |
| HH 29897 | 1.6 | 13.7 | 12.5 | 400 |
| HH 22074 | 12.5 | 6.9 | 12.5 | 400 |
| HH 22179 | 9.4 | 6.9 | 12.5 | 400 |
| HH 22167 | 6.3 | 13.7 | 12.5 | 400 |
| HH 22168 | 18.7 | 6.9 | 25 | 400 |
| HH 22978 | 3.1 | 6.9 | 25 | 400 |
| HH 22869 | 6.2 | 6.9 | 25 | 400 |
| HH 22979 | 3.1 | 6.9 | 18.7 | 400 |
| HH 56 | 12.5 | – | – | 400 |
| ATCC 19660 NIH 180 | 3.1 | – | – | 400 |
| Average Pseudomonas MIC (40 strains) | 9.4 | 7.5 | 21.7 | 395 |

* Average of two or more tests

The results show that SK&F 36387-J is highly active against all strains of Pseudomonas sp. tested. Of the other compounds, only the antibiotic gentamicin possesses the order of activity shown by SK&F 36387-J. Silver sulfadiazine was consistently effective at levels approximately 2× higher than SK&F 36387-J and gentamicin. Mafenide, however, displayed activity only at test levels 8× to 16× higher than the other compounds.

An additional experiment was conducted to determine the ability of SK&F 36387-J to prolong the lifetimes of burned mice infected with Pseudomonas. Male, albino, Charles River mice (14–18 grams) were burned by immersing the tails of etherized animals in water at 70°C for 5 seconds. Inoculation with Pseudomonas aeruginosa (ATCC No. 19660, NIH No. 180) was carried out 2 hours later by dipping the burned tails in an 18 hour broth culture of the organism. The tails were then encased in soft latex tubing three-sixteenths inch bore, one-sixteenth inch wall) which was stapled to the loose skin at the base of the tail with Michel wound clips. Five hours post-infection, a single application of the test ointment (approximately 1.0 ml) was injected into the sheath enclosing the tail and the end of the sheath closed with a size 00 cork to avoid ointment loss. Mice were observed daily for deaths during the entire 12 day duration of the test. Heart blood and the kidneys of mice which died were cultured for viable organisms; in all cases, Pseudomonas was recovered, indicating a Pseudomonas septicemia. Results are shown in Table 11.

TABLE II
Topical chemotherapy of *Pseudomonas septicemia* in burned mice

| Ointment type | Concentration used, percent | No. of mice | Percent survivors [1]—Days post-infection | | | | | | | | | | | | |
|---|---|---|---|---|---|---|---|---|---|---|---|---|---|---|---|
| | | | 0 | 1 | 2 | 3 | 4 | 5 | 6 | 7 | 8 | 9 | 10 | 11 | 12 |
| SK&F 36387-J | 0.2 | 30 | 100 | 100 | 97 | 97 | 97 | 97 | 93 | 93 | 93 | 90 | 90 | 90 | 90 |
| Placebo | | 70 | 100 | 100 | 88 | 59 | 51 | 46 | 34 | 28 | 25 | 21 | 21 | 21 | 21 |
| Nitrofurazone [2] | 0.2 | 20 | 100 | 100 | 95 | 80 | 65 | 60 | 55 | 55 | 45 | 35 | 30 | 30 | 30 |
| Gentamicin | 0.12 | 30 | 100 | 100 | 100 | 90 | 83 | 83 | 80 | 73 | 67 | 63 | 60 | 60 | 60 |
| None (infection control) | | 120 | 100 | 100 | 54 | 23 | 16 | 15 | 13 | 12 | 9 | 9 | 9 | 8 | 8 |
| Burn control | | 40 | 100 | 100 | 100 | 100 | 98 | 91 | 90 | 90 | 90 | 90 | 90 | 90 | 90 |

[1] Average of 3 tests.
[2] Average of 2 tests.

The results indicate that SK&F 36387-J, in a 0.2 percent ointment, provided excellent protection against the *Pseudomonas aeruginosa* infection produced in burned mice. The protection provided by a single application was long lasting, with 90 percent of the animals still protected on the 12th day after treatment. Gentamicin ointment provided initial protection equal to that of SK&F 36387-J, but its protective effect decreased with time. Commercial nitrofurazone ointment (0.2 percent) was protective for the first few days of the test only; by the test's end, 70 percent of the treated animals had died. Untreated, infected animals quickly succumbed to their Pseudomonas infections (77 percent died by day 3); the burn control animals (no infection) survived the test with only 4/40 deaths.

The complexes of the present invention are intended to be used topically. They are formulated for such use by combining them with appropriate topically acceptable carriers or vehicles and other materials to form antiseptic solutions, soaps, shampoos, lotions, ointments, creams, toothpaste, powders, mouthwashes, etc. Those skilled in the art of pharmaceutical chemistry will be able to formulate these compositions without extensive experimentation utilizing normal skills as well as the information provided in the following examples. A solution should contain about 0.01–10 percent of the complex. A topical ointment should contain about 0.025–0.5 percent of the complex.

The following examples are intended to illustrate the complexes and compositions of the present invention, but are not to be constructed as limiting the scope thereof.

EXAMPLE 1

1:1 Complex of Phosphanilic Acid and 3-Nitro-9-aminoacridine

To a warm solution of 180 g. (0.75 m.) of 3-nitro-9-aminoacridine in 1800 ml. of dimethyl sulfoxide was added a hot solution of 146 g. (0.84 m.) of phosphanilic acid in 1,800 ml. of dimethyl sulfoxide. The dark red solution was stirred vigorously while 3,600 ml. of hot water was rapidly added. The reaction mixture was cooled to about 10°C. and the product separated by filtration, washed with water and dried in vacuo at 100°C. to give 296 g. (95.5 percent yield) of 3-nitro-9-aminoacridine phosphanilate.

EXAMPLE 2

2:1 Complex of Phosphanilic Acid and 3-Nitro-9-aminoacridine

To a warm solution of 42 g. (0.176 m.) of 3-nitro-9-aminoacridine in 450 ml. of dimethyl sulfoxide was added a hot solution of 68.5 g. (0.39 m.) of phosphanilic acid in 900 ml. of hot dimethyl sulfoxide. The dark solution was stirred vigorously while 5,600 ml. of hot water was rapidly added. The reaction mixture was cooled to about 10°C. and the product separated by filtration, washed with water and dried in vacuo at 100°C. to give 98 g. (95 percent yield) of 2-nitro-9-aminoacridine, diphosphanilic acid complex.

EXAMPLE 3

In the same manner as in Example 1, a slight excess of phosphanilic acid may be reacted with each of the following acridines to give the corresponding 1:1 complexes.

9-aminoacridine
3-aminoacridine
3,9-diaminoacridine
3,6-diaminoacridine
4,9-diaminoacridine
3,7-diaminoacridine
9-amino-4-methylacridine
9-amino-1-methylacridine
9-amino-3-methylacridine
9-amino-2-methylacridine
9-amino-3-chloroacridine
9-amino-2-chloroacridine
9-amino-1-chloroacridine
9-amino-4-chloroacridine
3-amino-6-chloroacridine
3-amino-7-chloroacridine
1,6-diaminoacridine
2,6-diaminoacridine
1,9-diaminoacridine
2,9-diaminoacridine
9-amino-2,4-dimethylacridine
9-amino-4,5-dimethylacridine
9-amino-4-ethylacridine
9-amino-1-methoxyacridine
9-amino-2-methoxyacridine
9-amino-3-methoxyacridine
9-amino-4-methoxyacridine
9-amino-1-chloroacridine
9-amino-2-chloroacridine
9-amino-3-chloroacridine
9-amino-4-chloroacridine
9-amino-1-nitroacridine
9-amino-2-nitroacridine
9-amino-3-nitroacridine
9-amino-4-nitroacridine
9-amino-2-phenylacridine
9-amino-4-phenylacridine
9-amino-2-cyanoacridine
9-methylaminoacridine
9-amino-2-carbomethoxyacridine
9-amino-2-carbamoylacridine
3-dimethylaminoacridine

EXAMPLE 4

In the same manner as in Example 2, a slight excess over 2 equivalents of phosphanilic acid may be reacted with 1 equivalent of each of the acridines named in Example 3 to give the corresponding 2:1 phosphanilic acid-acridine complexes.

EXAMPLE 5

Examples of suitable formulations of the complexes are as follows:

Antiseptic solution 0.05% w/v solution of the 1:1 complex of phosphanilic acid and 9-amino-3-nitroacridine in 50 percent glycerin. Pure glycerin may also be used as solvent.

Topical ointment (water-washable, oil-in-water emulsion)

|  | % w/w |
|---|---|
| 1:1 complex of phosphanilic acid and 9-amino-3-nitroacridine | 0.200 |
| Light liquid petrolatum | 5.000 |
| Cetyl alcohol | 4.000 |
| Stearyl alcohol | 6.000 |
| Tween 60 (Polyoxyethylene sorbitan monostearate) | 2.100 |
| Span 60 (Sorbitan monostearate) | 2.100 |
| Propylparaben | 0.150 |
| Ethylparaben | 0.100 |
| Glycerin | 10.000 |
| Water | 70.350 |

| Topical ointment | |
|---|---|
| 1:1 complex of phosphanilic acid and 9-amino-3-nitroacridine | 0.20 |
| Polyethylene glycol 400 | 60.00 |
| Polyethylene glycol 4006 | 39.80 |

| Ophthalmic ointment | |
|---|---|
| 1:1 complex of phosphanilic acid and 9-amino-3-nitroacridine | 0.20 |
| Liquid petrolatum | 30.00 |
| White petrolatum | 69.80 |

| Topical suspension | |
|---|---|
| 1:1 complex of phosphanilic acid and 9-Amino-3-nitroacridine | 0.200 |
| Light liquid petrolatum | 1.500 |
| Cetyl alcohol | 2.400 |
| Stearyl alcohol | 3.000 |
| Tween 60 (Polyoxyethylene sorbitan monostearate) | 0.630 |
| Span 60 (Sorbitan monostearate) | 0.630 |
| Glycerin | 3.000 |
| Thimerosal | 0.002 |
| Water | q.s. ad |

Other complexes from Examples 2, 3 and 4 may similarly be formulated into solutions, ointments, and suspensions.

I claim:

1. A 1:1 or 2:1 complex of phosphanilic acid and 9-amino-3-nitroacridine.

2. A complex according to claim 1, consisting of 9-amino-3-nitroacridine and 2 equivalents of phosphaniic acid.

3. A complex according to claim 1, consisting of 9-amino-3-nitroacridine and 1 equivalent of phosphanilic acid.

* * * * *